United States Patent [19]

Endo et al.

[11] 4,180,816
[45] Dec. 25, 1979

[54] TESTING CIRCUIT FOR RADAR-OPERATED VEHICLE SAFETY ASSURANCE SYSTEMS

[75] Inventors: Hiroshi Endo, Yokosuka; Norio Fujiki, Yokohama, both of Japan

[73] Assignee: Nissan Motor Company, Limited, Yokohama, Japan

[21] Appl. No.: 937,763

[22] Filed: Aug. 29, 1978

[30] Foreign Application Priority Data

Aug. 29, 1977 [JP] Japan .............................. 52-102642

[51] Int. Cl.² .............................................. G01S 7/40
[52] U.S. Cl. .................................. 343/7 VM; 343/17.7
[58] Field of Search ........................... 343/7 VM, 17.7

[56] References Cited
U.S. PATENT DOCUMENTS 3,459,937  8/1969  Gittinger ........................ 343/17.7 X Primary Examiner—T. H. Tubbesing
Attorney, Agent, or Firm—Lowe, King, Price & Becker

[57] ABSTRACT

A testing circuit for a radar-operated vehicle safety assurance system includes a test signal generator for generating an artificial intermediate frequency return signal. The radar system is switched on a manual command signal from the normal operating mode to an under-test mode to accept the artificial signal to determine the speed of the vehicle relative to a hypothetical target and the instantaneous value of the distance to the hypothetical target. The radar system includes a vehicle roadway speed sensor which normally supplies the system with the instantaneous speed value of the vehicle. When the system is switched to the under-test mode, a signal indicative of a predetermined vehicle road speed is applied to the radar to determine the safety distance to the hypothetical target. When the instantaneous value of the distance to the hypothetical target corresponds to the safety distance, an alarm signal is delivered from the radar system. This signal is checked to see if it occurs within a preselected time interval so as to ensure that the radar system functions properly.

9 Claims, 5 Drawing Figures

TESTING CIRCUIT FOR RADAR-OPERATED VEHICLE SAFETY ASSURANCE SYSTEMS

BACKGROUND OF THE INVENTION

The present invention relates generally to Doppler radar operated vehicle safety assurance systems, and in particular to a testing circuit for such radar systems to ensure that the radar system operates properly prior to starting of the vehicle.

Since the Doppler radar safety assurance system for roadway vehicles is an important item of the vehicle components, a trouble in a vital part of the system could result in a fatal accident. The vehicle-mounted radar is currently given a thorough check on a routine basis. However, it is desirable to give a check whenever the vehicle is started.

SUMMARY OF THE INVENTION

The primary object of the invention is to avoid fatal accidents due to the malfunction of a radar-operated vehicle safety assurance system.

Another object of the invention is to provide a testing circuit for a radar-operated vehicle safety assurance system to enable the vehicle occupant to give a thorough check to the radar assurance system before he starts the vehicle.

A further object of the invention is to provide a radar-operated vehicle safety assurance system which is provided with a built-in test circuit which gives an artificial return signal to the radar assurance system to check for the validity of the operating function of the system.

The test circuit according to the invention is comprised of a test signal generator which generates an artificial intermediate frequency return signal from a hypothetical target. This signal is identical to that obtained from the output of a mixer stage of the radar system. Specifically, the test signal comprises a train of intermediate frequency bursts which occur at intervals that decrease as a function of time. On a manual command signal, the radar system is switched from the normal operating mode to an under-test mode to accept the test signal through its intermediate frequency amplifier stage. The test signal is processed to give the vehicle's relative speed to the hypothetical target and the distance thereto. Also included is a vehicle roadway speed simulator which applies a signal indicative of a particular roadway speed to the radar system to permit it to decide the safety range in respect of the hypothetical target. When the distance to the hypothetical target derived from the test signal corresponds to the safety range, an alarm signal is delivered from the radar assurance system which signal is checked to see if it occurs within a predetermined time interval so as to ensure that the radar system operates properly.

BRIEF DESCRIPTION OF THE DRAWINGS

The invention will be further described by way of example with reference to the accompanying drawings, in which.

DETAILED DESCRIPTION

Figure 1:
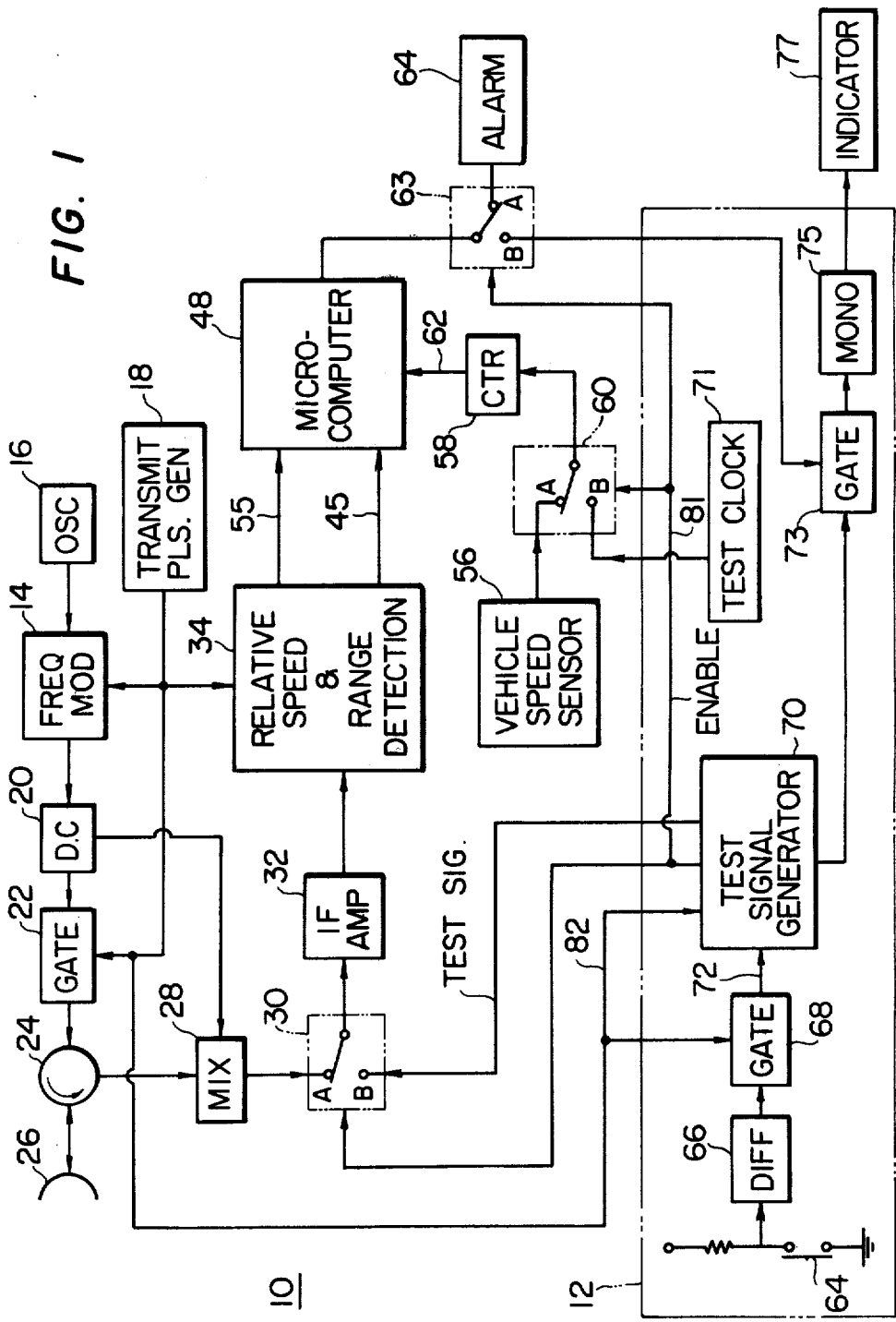
FIG. 1 is a general block diagram of the radar-operated vehicle safety assurance system incorporating a testing circuit shown in a broken-line rectangle.

FIG. 1 is an illustration of a Doppler radar system 10 for roadway vehicles incorporating the radar testing circuit of the invention which is shown in a broken-line rectangle 12. Before describing the radar testing circuit 12 of the invention, reference is first made to the Doppler radar system 10 which is only an exemplary embodiment and may be any one of Doppler radar systems of conventional design.

A frequency modulator 14 provides a train of periodically frequency-shifted signals by modulating the frequency of a 150 MHz signal from an oscillator 16 in response to transmit pulses from a pulse generator 18. The microwave energy so modulated by modulator 14 is passed through a directional coupler 20 to a transmission gate 22 which allows passage of the microwave energy in response to the transmit pulse from the pulse generator 18 through circulator 24 to a transmit/receive antenna 26. Therefore, the transmitted microwave energy is a train of bursts spaced at periodic intervals and the reflected energy may return as an echo during the interval between successive burst energy in which the frequency of the signal from the modulator 14 is the frequency of the oscillator 16.

The return signal is received by antenna 26, passed through circulator 24 and applied to a mixer stage 28 to which the output from the frequency modulator 14 is also applied through the directional coupler 20. The mixer output is coupled through a switch contact 30, now in the A position, to an intermediate amplifier 32 where the input signal is strengthened to a suitable voltage level for signal processing in a relative speed and range detection circuit shown in block 34.

Figure 2:
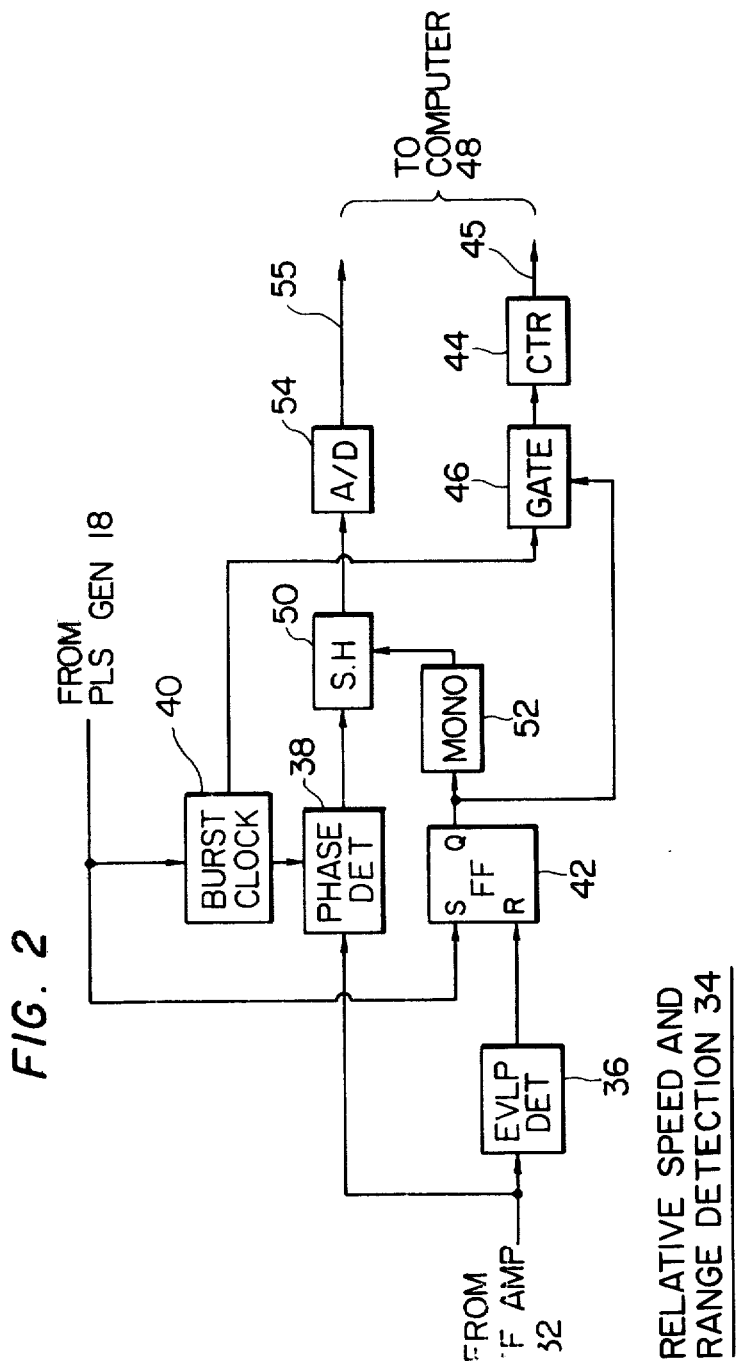
FIG. 2 shows the detail of the relative speed and range detection circuit of FIG. 1.

As illustrated in FIG. 2, the detection circuit 34 comprises an envelope detector 36 and a phase detector 38 both being connected to the output of the IF amplifier stage 32. The transmit pulses from the generator 18 are applied, on the one hand, to a burst clock 40 in which a train of high clock rate pulses is generated in response to a transmit pulse from pulse generator 18, and on the other hand to the set terminal of a flip-flop 42. In response to a transmit pulse the Q output of the flip-flop 42 switches to a high voltage level. The envelope detector 36 detects the arrival of the return signal and triggers the reset terminal of the flip-flop 42 so that its Q output turns off. Therefore, the length of the high voltage pulse at the Q output of flip-flop 42 is a measure of the go-and-return path and therefore the range of a target of interest. The period of the output pulse from the flip-flop 42 is measured by means of a binary counter 44 through application of the burst clock pulses thereto via gate 46 in the presence of the Q output of flip-flop 42. The counter 44 thus produces range data in digital form and supplies it to a microcomputer 48 through lead 45.

The phase detector 38 receives the burst clock pulses to detect the relative phase of the received return signal to generate an output representing the phase difference between the burst clock and the return signal. A sample-and-hold circuit 50 is connected to the output of the phase detector 38 to sample and phase detector output in response to the Q output of flip-flop 42 being turned off. This sampling action is provided by means of a monostable multivibrator 52 connected to the Q output of flip-flop 42 to generate a sampling pulse in response to the trailing edge of the pulse from the flip-flop 42. The output of the sample-and-hold circuit 50 represents the relative speed of the radar-mounted vehicle to the target of interest in analog form which is converted into digital form by means of an analog-to-digital converter 54 whose output is connected to the microcomputer 48 through lead 55.

A vehicle speed sensor 56 is provided which supplies electrical pulses related to the speed of the radar-mounted vehicle relative to the roadway surface to a binary counter through a switch contact 60 which is normally in the A position. The counter 58 measures the vehicle speed by counting the pulses supplied thereto and feeds its digital output to the microcomputer 48 through lead 62.

With the data concerning the relative speed of the radar-mounted vehicle supplied on line 55 and its roadway speed data supplied on line 62, the microcomputer 48 computes a distance which is considered to be a safety limit of the vehicle continues to approach the target vehicle. If the detected range signal on line 45 becomes smaller than the computed distance, the microcomputer then issues a warning signal through a switch contact 63, which is normally in the A position, to an alarm 64.

The above description is concerned with the normal operation of the Doppler radar vehicle warning system 10. When the driver decides to check to see if there is any trouble in the radar system 10 before the vehicle is started, he presses a button 64 to present a short-circuit condition to a differentiating circuit 66 which in response thereto generates a trigger pulse of 2 microseconds to enable a gate 68 to allow passage of a transmit pulse from the pulse generator 18 to a test signal generator 70 through lead 72.

Figure 3:
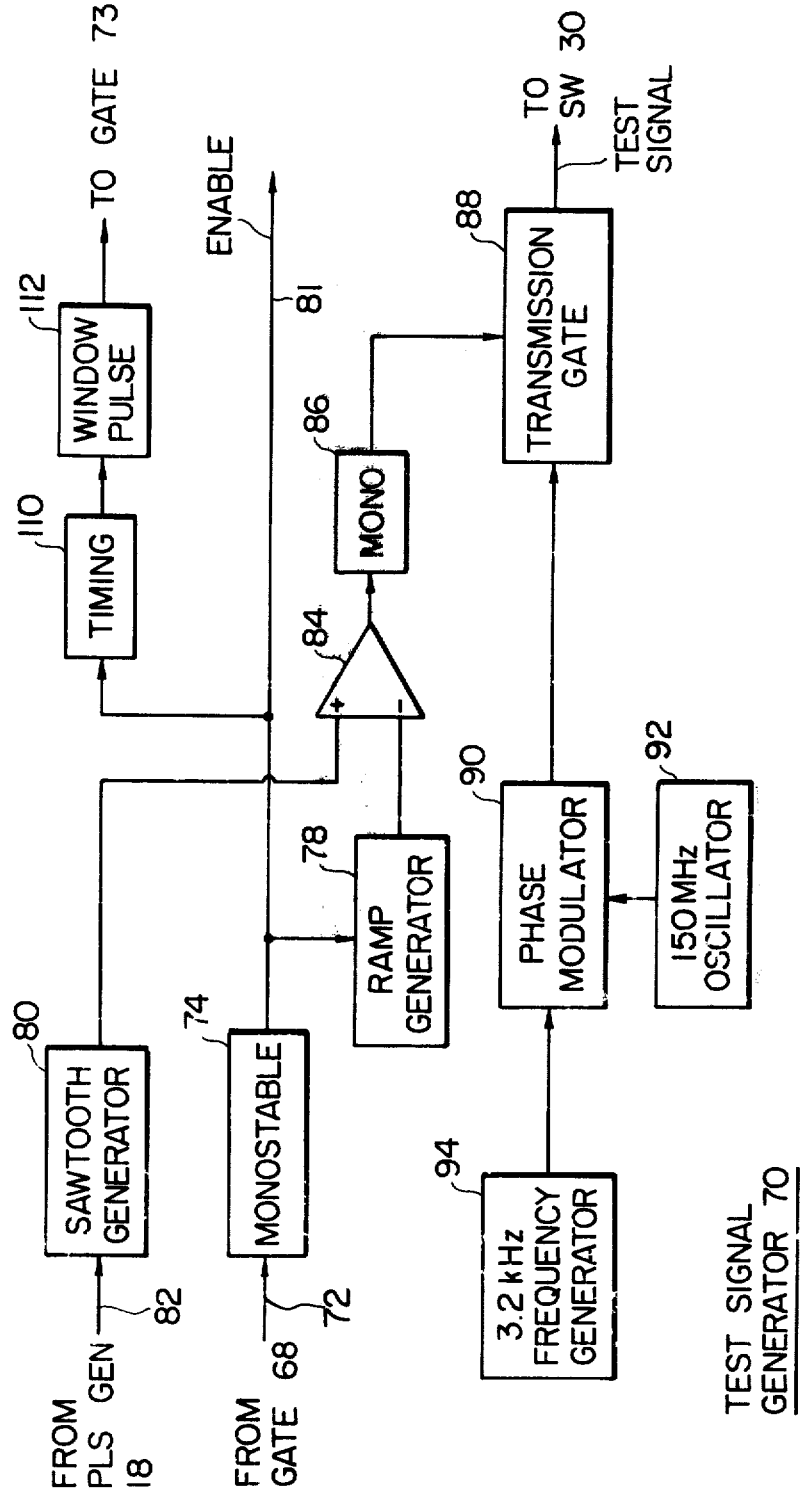
FIG. 3 shows the detail of the test signal generator of FIG. 1.

The test signal generator 70 comprises, as shown in FIG. 3, a monostable multivibrator 74 which is responsive to a transmit pulse from the gate 68 to generate a test enable pulse 100 (FIG. 4a) of 5-second duration. The enable pulse is applied through lead 81 to switches 30, 60 and 63 to transfer their switch contacts to their B positions to switch the radar system 10 to the under-test mode.

A ramp generator 78 is connected to the monostable 74 to generate a ramp voltage 102 which linearly decreases as a function of time (FIG. 4d) in response to the leading edge of the enable pulse 100. A sawtooth generator 80 is provided to respond to transmit pulses 104 (FIG. 4b) supplied from pulse generator 18 through lead 82 by generating a train of sawtooth wave pulses 106 (FIG. 4c) in step with each transmit pulse.

A comparator 84 compares the instantaneous level of the linearly decreasing ramp voltage 102 with the instantaneous level of each sawtooth wave pulse 106. This comparator switches to a high voltage output condition when coincidence occurs between them. A monostable multivibrator 86, connected to the output of the comparator 84, generates a coincidence pulse 108 (FIG. 4e) in response to the leading edge of the output from the comparator 84.

It will be noted that the coincidence pulses occur at intervals which decrease with time. These coincidence pulses are used as a gating control signal for a transmission gate 88.

Figure 4:
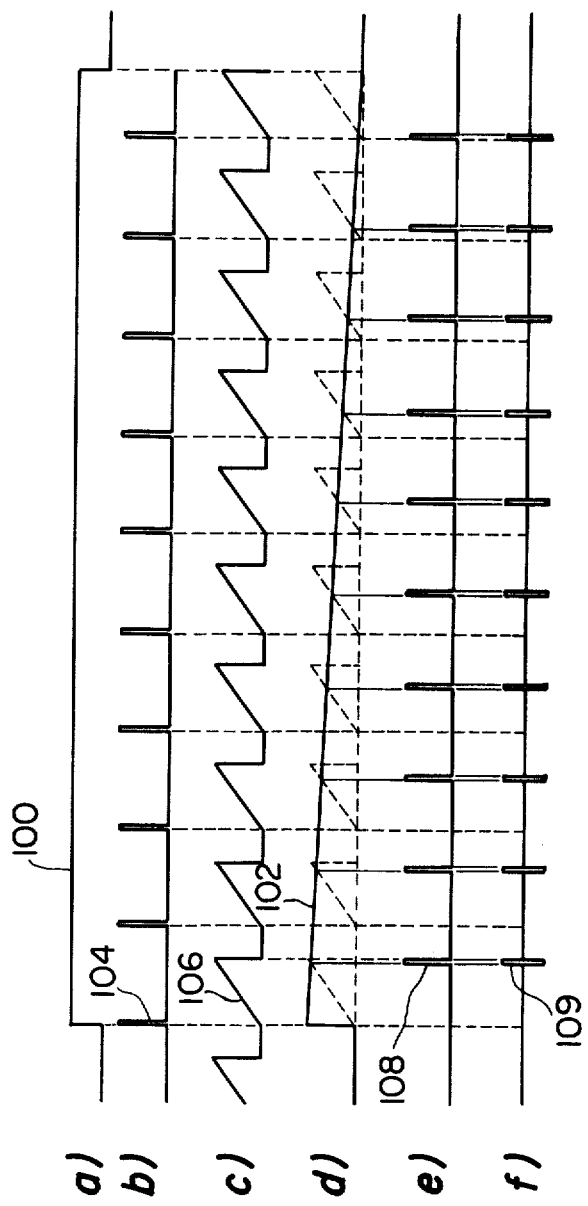
FIGS. 4a to 4f are a series of waveforms appearing in the circuit of FIG. 2.

The test signal generator 70 further includes a phase modulator 90 which combines a 150-MHz signal from an oscillator 92 with a 3.2-kHz signal from a low frequency generator 94 to modulate the phase of the 150-MHz signal with the low frequency signal. The phase-modulated 150-MHz signal is applied to the transmission gate 88. Therefore, the output 109 signal from the transmission gate 88 is a train of burst signal as shown in FIG. 4f in step with the coincidence pulses. This burst signal is an artificial return signal from a hypothetical target and used as a test signal which is applied through the B contact of switch 30 to the IF amplifier 32 and thence to the relative speed and range detection circuit 34.

Assuming that the interval between successive transmit pulses is 1 microsecond, FIGS. 4a to 4f illustrate a situation wherein a vehicle at a speed of 72 kilometers per hour would be in collision with a target located one hundred meters ahead five seconds after the detection of the target.

Figure 5:
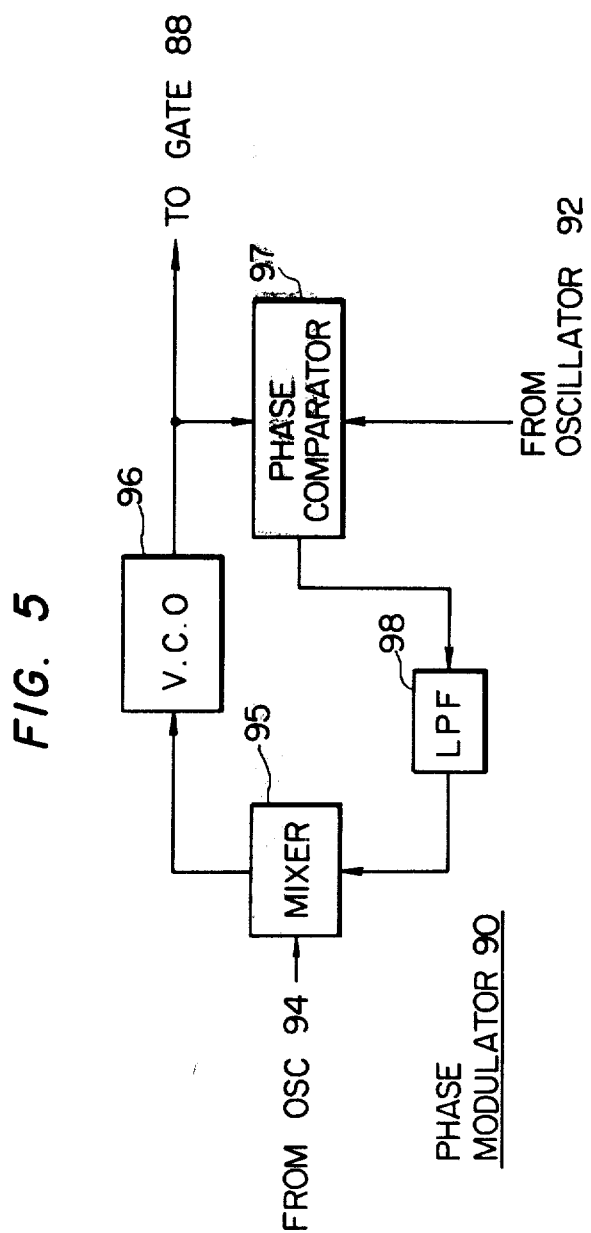
FIG. 5 is the detail of the phase modulator of FIG. 3.

FIG. 5 is an example of the phase modulator 90 which is shown as comprising a mixer 95 receptive of the outputs from the low frequency oscillator 94 and an output from a lowpass filter 98 to provide a mixer output to a voltage-controlled oscillator 96, whose output is coupled to a phase comparator 97 for phase comparison with the 150-MHz signal from the oscillator 92. The output of the phase comparator 97 is shown coupled to the lowpass filter 98 thereby forming a phase-locked loop. The output signal from the phase modulator is obtained from the output circuit of the voltage-controlled oscillator 96.

The test signal generator 70 further includes a timing circuit or a monostable multivibrator 110 connected to the output of the monostable 74 to generate a pulse of 2.4 seconds in response to the leading edge of the enable pulse 100. To the output of the monostable 110 is connected a window pulse generator 112 which generates a pulse of 0.1-second duration in response to the trailing edge of the 2.4-second pulse. This window pulse is applied to the control terminal of a gate 73 (FIG. 1) to determine the coincidence of an output from the microcomputer 48. If the computer output falls within the window pulse, the test circuit 12 recognizes that the Doppler radar system 10 operates properly and triggers a monostable multivibrator 75 to provide a signal for energizing an indicator 77.

The testing circuit 12 further includes a test clock source 71 which supplies a train of pulses at intervals which correspond to a vehicle speed of 72 kilometers per hour. The clock pulses are supplied through the B position contact of switch 60 to the counter 58 wherein the input clock pulses are converted into a digital signal representing the vehicle speed.

Assuming that the vehicle's deceleration rate is 0.4 g and the vehicle speed relative to the target is 72 km/h, and the computer is so programmed that it decides that the safety distance to the target is 51 meters. This means that the vehicle would travel the distance of 51 meters in 2.45 seconds. If the radar system 10 is working properly, the computer 48 will generate an alarm pulse of 0.05-second duration after the elapse of 2.45 seconds from the application of the test signal so that coindidence occurs in the gate 73 to energize the indicator 77.

What is claimed is:

1. A testing circuit for a radar-operated safety assurance system for a roadway vehicle including means for transmitting a train of microwave burst energy and receiving a return signal from a target, means for mixing the return signal with a locally generated signal to derive an intermediate frequency return signal, means for sensing the roadway speed of said vehicle, relative speed detecting means for deriving the speed of said vehicle relative to said target from said intermediate frequency return signal, range detecting means for deriving the range of said target from said intermediate frequency return signal, and a decision making circuit responsive to said sensed vehicle roadway speed, said derived relative vehicle speed and said derived range of the target to determine a safety distance to said target, comprising:

- means for generating an artificial intermediate frequency return signal from a hypothetical target, said artificial return signal comprising a train of intermediate frequency burst signals which occur at intervals that decrease as a function of time;
- means for generating a signal indicative of a predetermined vehicle roadway speed;
- means for switching said radar system in response to a manual command from a normal operating mode to an under-test mode in which said relative speed detecting means and said range detecting means are receptive of said generated artificial intermediate frequency return signal and said decision making circuit is receptive of said generated predetermined vehicle roadway speed indicative signal, whereby said decision making circuit determines a safety distance to said hypothetical target and generates an output signal when the instantaneous value of the distance to said hypothetical target derived by said range detecting means corresponds to said determined safety distance to said hypothetical target; and
- means for determining whether said output signal from said decision making circuit occurs within a predetermined time interval.

2. A radar-operated safety assurance system for a roadway vehicle, comprising:
- means for transmitting a train of microwave burst energy and receiving a return signal from a target;
- means for mixing the return signal with a locally generated signal to derive an intermediate frequency return signal;
- means for sensing the roadway speed of said vehicle;
- relative speed detecting means for deriving the speed of said vehicle relative to said target from said intermediate frequency return signal;
- range detecting means for deriving the range of said target from said intermediate frequency return signal;
- a decision making circuit responsive to said sensed vehicle roadway speed, said derived relative vehicle speed and said derived range of the target to determine a safety distance to said target;
- means for generating an artificial intermediate frequency return signal from a hypothetical target, said artificial return signal comprising a train of intermediate frequency burst signals which occur at intervals that decrease as a function of time;
- means for generating a signal indicative of a predetermined vehicle roadway speed;
- means for switching said relative speed detecting means and said range detecting means from a normal operating mode to an under-test mode to receive said artificial intermediate frequency return signal instead of said intermediate frequency signal derived from said mixing means and switching said decision making circuit to receive said generated predetermined vehicle roadway speed indicative signal instead of the output from said speed sensing means, whereby said decision making circuit determines a safety distance to said hypothetical target and generates an output signal when the instantaneous value of distance to said hypothetical target derived by said range detecting means corresponds to said determined safety distance to said hypothetical target; and
- means for determining whether said output signal from said decision making circuit occurs within a preselected time interval.

3. A testing circuit as claimed in claim 1 or 2, wherein said means for generating an artificial intermediate frequency return signal comprises:
- a first ramp generator for generating a train of ramp voltage waveforms;
- a second ramp generator for generating a ramp voltage which decreases as a function of time;
- means for generating a pulse in response to a coincidence in voltage between the output signals from said first and second ramp generators;
- means for generating a phase-modulated intermediate frequency signal; and
- gating means for passing said phase-modulated intermediate frequency signal in the presence of said coincidence pulse.

4. A testing circuit as claimed in claim 3, wherein said first ramp voltage generator includes means for generating each of said ramp voltage waveforms in said train in step with the microwave burst energy transmitted from said radar system.

5. A testing circuit as claimed in claim 3, wherein said second ramp voltage generator includes means for generating said decreasing ramp voltage in step with said transmitted microwave burst energy.

6. A method for testing a radar-operated safety assurance system for a roadway vehicle, comprising the steps of:
- transmitting a train of microwave burst energy and receiving a return signal from a target;
- mixing the return signal with a locally generated signal and generating an intermediate frequency return signal therefrom;
- generating a vehicle roadway speed signal;
- generating a signal indicative of the speed of said vehicle relative to said target from said intermediate frequency return signal;
- generating a signal indicative of the range of said target from said intermediate frequency return signal;
- generating a signal indicative of a safety distance to said target based on said vehicle roadway speed signal, said relative vehicle speed signal, and said target range signal;
- generating an artificial intermediate frequency return signal from a hypothetical target, said artificial return signal comprising a train of intermediate frequency burst signals which occur at intervals that decrease as a function of time;
- generating a signal indicative of a predetermined vehicle roadway speed;
- generating a signal indicative of the speed of said vehicle relative to said hypothetical target from said artificial intermediate frequency return signal;

generating a signal indicative of the range of said hypothetical target from said artificial intermediate return signal;

generating a signal indicative of a safety distance to said hypothetical target based on said predetermined vehicle roadway speed signal, said vehicle speed signal relative to said hypothetical target, and said hypothetical target range signal;

generating an output signal when the instantaneous value of said hypothetical target range signal equals said hypothetical target safety distance signal; and comparing said output signal with a preselected time interval signal.

7. The method of claim 6 wherein said step of generating an artificial intermediate frequency return signal further includes the steps of:

generating a train of ramp voltage waveforms;

generating a ramp voltage signal which decreases as a function of time;

generating a pulse in response to a coincidence in voltage between said first ramp voltage waveform and said second ramp voltage signal;

generating a phase-modulated intermediate frequency signal; and outputting said phase-modulated intermediate frequency signal when said coincidence pulse is generated.

8. The method of claim 7, wherein each of said ramp voltage waveforms in said train is generated in step with the microwave burst energy transmitted from said radar system.

9. The method of claim 7, wherein said decreasing ramp voltage is generated in step with said transmitted microwave burst energy.

* * * * *